United States Patent
Zhu

(10) Patent No.: US 11,082,532 B2
(45) Date of Patent: Aug. 3, 2021

(54) METHOD AND APPARATUS FOR SENDING INFORMATION

(71) Applicant: Baidu Online Network Technology (Beijing) Co., Ltd., Beijing (CN)

(72) Inventor: Ziqiang Zhu, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 154 days.

(21) Appl. No.: 16/354,507

(22) Filed: Mar. 15, 2019

(65) Prior Publication Data

US 2020/0007656 A1 Jan. 2, 2020

(30) Foreign Application Priority Data

Jun. 29, 2018 (CN) .......................... 201810698456.8

(51) Int. Cl.
*H04L 29/08* (2006.01)
*G10L 15/08* (2006.01)
*G10L 15/22* (2006.01)

(52) U.S. Cl.
CPC .............. *H04L 67/34* (2013.01); *G10L 15/08* (2013.01); *G10L 15/22* (2013.01); *G10L 2015/088* (2013.01); *G10L 2015/223* (2013.01)

(58) Field of Classification Search
CPC ......... H04L 67/34; G10L 15/08; G10L 15/22; G10L 2015/088; G10L 2015/223; G10L 15/1822; G06F 8/65
See application file for complete search history.

(56) References Cited

U.S. PATENT DOCUMENTS

| 2007/0050386 A1* | 3/2007 | Busey ..................... G06F 16/86 |
| 2016/0048382 A1* | 2/2016 | Xi ............................. G06F 8/65 |
| | | 717/168 |
| 2017/0060566 A1 | 3/2017 | Li |

(Continued)

FOREIGN PATENT DOCUMENTS

| CN | 106297782 A | 1/2017 |
| CN | 108133707 A | 6/2018 |
| JP | 2017530496 A | 10/2017 |

*Primary Examiner* — Soe Hlaing
(74) *Attorney, Agent, or Firm* — Nixon Peabody LLP

(57) ABSTRACT

A method and apparatus for sending information are provided. An embodiment of the method comprises: determining, in response to acquiring a user speech audio through a target application, a user command instructed by the user speech audio, and determining whether the user command satisfies a preset trigger condition for plug-in downloading; and sending, in response to the user command satisfying the trigger condition for plug-in downloading, a request for downloading a target plug-in to a target server, the target plug-in being a plug-in in a preset plug-in set for the target application, and the plug-in being not locally installed. According to the embodiment, a terminal device may be triggered to download the plug-in based on the content instructed by the user speech audio, to implement the functional upgrading. Therefore, the self-learning capability and the self-upgrading capability of the terminal device are improved, which makes the response to the user command more accurate and more pertinent.

12 Claims, 7 Drawing Sheets

(56) References Cited

U.S. PATENT DOCUMENTS

2017/0068527 A1\* 3/2017 Wang ................ G06F 8/61
2018/0286407 A1\* 10/2018 Katoh ............... G10L 15/083
2019/0081982 A1\* 3/2019 Breton .............. G06F 21/50

\* cited by examiner

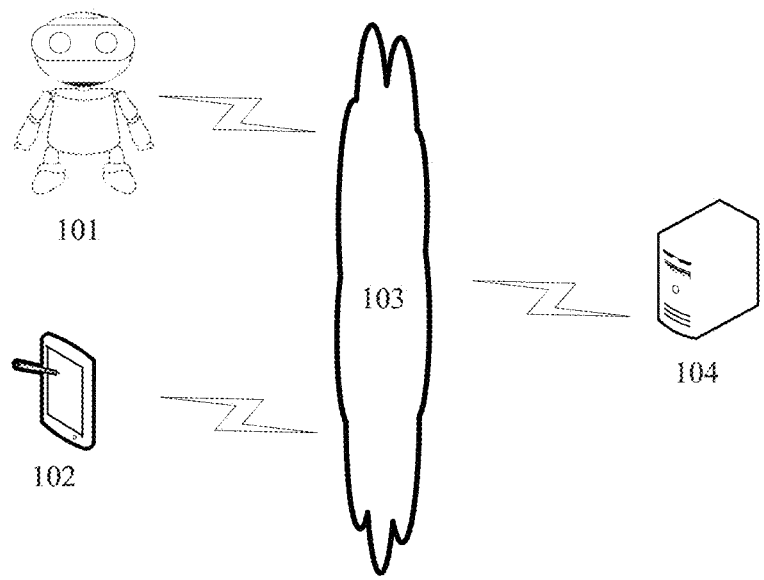

Fig. 1

Determining, in response to acquiring a user speech audio through a target application, a user command instructed by the user speech audio, and determining whether the user command satisfies a preset trigger condition for plug-in downloading — 201

Sending, in response to the user command satisfying the trigger condition for plug-in downloading, a request for downloading a target plug-in to a target server — 202

Fig. 2

METHOD AND APPARATUS FOR SENDING INFORMATION

CROSS-REFERENCE TO RELATED APPLICATIONS

This disclosure claims priority to Chinese Patent Application no. 201810698456.8, filed with the China National Intellectual Property Administration (CNIPA) on Jun. 29, 2018, the contents of which are incorporated herein by reference in their entirety.

TECHNICAL FIELD

Embodiments of the present disclosure relate to the field of computer technology, and specifically to a method and apparatus for sending information.

BACKGROUND

In the existing technology, in a general interaction with an application based on a conversational artificial intelligence operating system, a user may need to use a function that is not supported by the current application. For example, when the speech "turning on the air conditioner" is inputted to an application such as a voice assistant, it is possible that the operation of turning on the air conditioner cannot be executed due to an absence of a program code controlling the turning on of the air conditioner. At this time, the voice assistant may play the speech such as "sorry, I cannot understand what you mean."

In the above application scenario, a developer may be required to add the program code implementing the corresponding function to the program of the application. Then, after being repackaged and republished by a technician, the application program is downloaded and

SUMMARY

Embodiments of the present disclosure propose a method and apparatus for sending information.

In a first aspect, the embodiments of the present disclosure provide a method for sending information. The method includes: determining, in response to acquiring a user speech audio through a target application, a user command instructed by the user speech audio, and determining whether the user command satisfies a preset trigger condition for plug-in downloading; and sending, in response to the user command satisfying the trigger condition for plug-in downloading, a request for downloading a target plug-in to a target server, the target plug-in being a plug-in in a preset plug-in set for the target application, and the plug-in being not locally installed.

In some embodiments, the user command instructs to execute an operation. The trigger condition for plug-in downloading includes that the operation that the user command instructs to execute is in executable. The target plug-in supports the operation.

In some embodiments, the trigger condition for plug-in downloading includes that the user command instructs to download the target plug-in.

In some embodiments, the method further includes: sending plug-in detection information to the target server, the plug-in detection information instructs the target server to detect whether the target plug-in is present in the plug-in set; and receiving, in response to a presence of the target plug-in in the plug-in set, a plug-in download address of the target plug-in sent by the target server.

In some embodiments, the method further includes: downloading, in response to detecting a download operation for the plug-in download address, the plug-in indicated by the plug-in download address.

In some embodiments, the sending plug-in detection information to the target server includes at least one of: sending the plug-in detection information to the target server periodically; sending, in response to determining the target application being in a non-running status or a background running status, the plug-in detection information to the target server; sending, in response to determining a current network being not a cellular network, the plug-in detection information to the target server; or sending, in response to determining a current system resource usage rate being less than a preset system resource usage rate threshold, the plug-in detection information to the target, server.

In a second aspect, the embodiments of the present disclosure provide an apparatus for sending information. The apparatus includes: a determination unit, configured to determine, in response to acquiring a user speech audio through a target application, a user command instructed by the user speech audio, and determine whether the user command satisfies a preset trigger condition for plug-in downloading; and a first sending unit, configured to send, in response to the user command satisfying the trigger condition for plug-in downloading, a request for downloading a target plug-in to a target server, the target plug-in being a plug-in in a preset plug-in set for the target application, and the plug-in being not locally installed.

In some embodiments, the user command instructs to execute an operation. The trigger condition for plug-in downloading includes that the operation that the user command instructs to execute is in executable. The target plug-in supports the operation.

In some embodiments, the trigger condition for plug-in downloading includes that the user command instructs to download the target plug-in.

In some embodiments, the apparatus further includes: a second sending unit, configured to send plug-in detection information to the target server, the plug-in detection information instructs the target server to detect whether the target plug-in is present in the plug-in set; and a receiving unit, configured to receive, in response to a presence of the target plug-in in the plug-in set, a plug-in download address of the target plug-in sent by the target server.

In some embodiments, the apparatus further includes: a downloading unit, configured to download, in response to detecting a download operation for the plug-in download address, the plug-in indicated by the plug-in download address.

In some embodiments, the second sending unit includes at least one of: a first sending module, configured to send the plug-in detection information to the target server periodically; a second sending module, configured to send, in response to determining the target application being in a non-running status or a background running status, the plug-in detection information to the target server; a third sending module, configured to send, in response to determining a current network being not a cellular network, the plug-in detection information to the target server; or a fourth sending module, configured to send, in response to determining a current system resource usage rate being less than a preset system resource usage rate threshold, the plug-in detection information to the target server.

In a third aspect, the embodiments of the present disclosure provide a terminal device for sending information. The terminal device includes: one or more processors; and a storage device, configured to store one or more programs. The one or more programs, when executed by the one or more processors, cause the one or more processors to implement the method in any embodiment of the method for sending information described.

In a fourth aspect, the embodiments of the present disclosure provide a robot. The robot includes: an audio acquisition device, configured to acquire a user speech audio through a target application; a request sending device, configured to send a request for downloading a target plug-in to a target server; one or more processors; and a storage device, configured to store one or more programs. The one or more programs, when executed by the one or more processors, cause the one or more processors to acquire the user speech audio through the target application via the audio acquisition device, and send the request for downloading the target plug-in to the target server via the request sending device, to implement the method in any embodiment of the method for sending information described.

In a fifth aspect, the embodiments of the present disclosure provide a computer readable medium for sending information, storing a computer program. The program, when executed by a processor, implements the method in any embodiment of the method for sending information described.

According to the method and apparatus for sending information provided by the embodiments of the present disclosure, in the situation where the user speech audio is acquired through the target application, the user command instructed by the user speech audio is determined, and whether the user command satisfies the preset trigger condition for plug-in downloading is determined. Then, in the situation where the user command satisfies the preset trigger condition for plug-in downloading, the request for downloading the target plug-in is sent to the target server. Thus, the terminal device may be triggered to download the plug-in based on the content instructed by the user speech audio, to implement the functional upgrading. Therefore, the self-learning capability and the self-upgrading capability of the terminal device are improved, which makes the response to the user command more accurate and more pertinent.

BRIEF DESCRIPTION OF THE DRAWINGS

After reading detailed descriptions of non-limiting embodiments given with reference to the following accompanying drawings, other features, objectives and advantages of the present disclosure will be more apparent:

FIG. 1 is a diagram of an illustrative system architecture in which an embodiment of the present disclosure may be applied;

FIG. 2 is a flowchart of an embodiment of a method for sending information according to the present disclosure;

DETAILED DESCRIPTION OF EMBODIMENTS

Figure 3A:
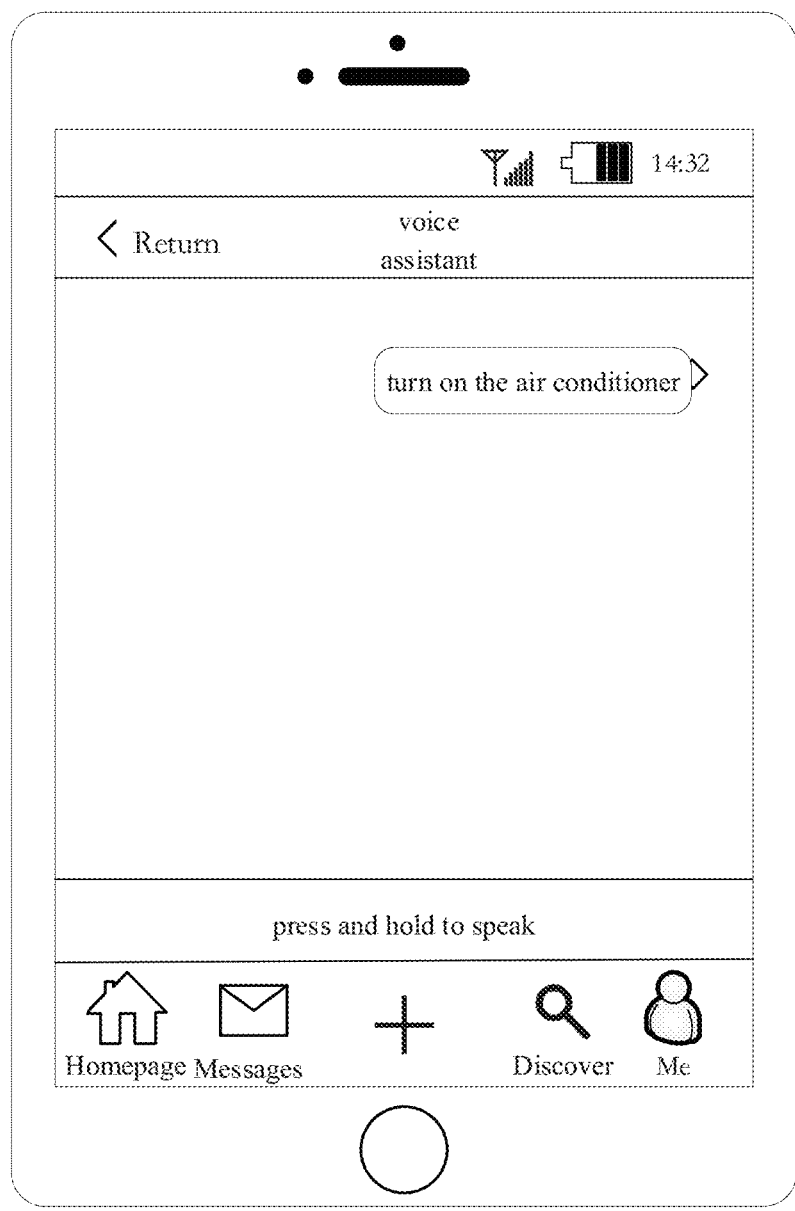
FIGS. 3A and 3B are schematic diagrams of an application scenario of the method for sending information according to the present disclosure.

The present disclosure will be described below in detail with reference to the accompanying drawings and in combination with the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

FIG. 1 shows an illustrative system architecture 100 in which a method for sending information or an apparatus for sending information according to an embodiment of the present disclosure may be applied.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, for example, wired or wireless communication links, or optical fiber cables.

A user may use the terminal devices 101 and 102 to interact with the server 104 via the network 103 to receive or send messages. Various client applications (e.g., voice interactive applications, web browser applications, shopping applications, search applications, instant communication tools, mailbox clients, and social platform software) may be installed on the terminal devices 101 and 102.

The terminal devices 101 and 102 may be hardware or software. When being the hardware, the terminal devices 101 and 102 may be various electronic devices having an audio acquisition function and supporting the receiving and sending of information, which include, but not limited to, a robot (e.g., a wheeled mobile robot and a walking mobile robot), a smart phone, a tablet computer, a laptop portable computer, and a desktop computer. When being the software, the terminal devices 101 and 102 may be installed on the above listed electronic devices. The terminal devices may be implemented as a plurality of pieces or software or a plurality of software modules (e.g., software or software modules for providing a distributed service), or as a single piece of software or a single software module, which will not be specifically defined here.

The server 104 may be a server providing various services. As an example, the server 104 may be a backend speech processing server providing a support for a user speech audio received from the terminal devices 101 and 102. The backend speech processing server may analyze data such as the received user speech audio. For example, the recognition is performed on the user speech audio through a technology such as an automatic speech recognition (ASR) technology, or a natural language understanding (NLU) technology, to generate a user command that may be understood by the machine. The server may feed the processed result (e.g., the user command) back to the terminal devices, to make the terminal devices execute an operation matching the user speech audio. In addition, the server 104 may also be a server for sending a download address of a plug-in requested by a terminal to the terminal devices 101 and 102. When being the server for sending the download address of the plug-in requested by the terminal to the terminal devices 101 and 102, the server 104 may first determine the download address of the plug-in requested by the terminal devices 101 and 102, and then send the download address to the terminal devices.

It should be noted that the method for sending information provided by the embodiments of the present disclosure is generally performed by the terminal devices 101 and 102. Correspondingly, the apparatus for sending information is generally provided in the terminal devices 101 and 102.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Further referring to FIG. 2, a flow 200 of an embodiment of a method for sending information according to the present disclosure is illustrated. The method for sending information includes the following steps.

Step 201, determining, in response to acquiring a user speech audio through a target application, a user command instructed by the user speech audio, and determining whether the user command satisfies a preset trigger condition for plug-in downloading.

In some embodiments, in the situation where the user speech audio is acquired through the target application, an executor (e.g., the terminal devices shown in FIG. 1) of the method for sending information may determine the user command instructed by the user speech audio. Then, the executor may further determine whether the user command satisfies the preset trigger condition for plug-in downloading.

Here, the target application may be an application installed on the executor. For example, the target application may be an application having a voice interactive function (e.g., an application based on a conversational artificial intelligence operating system). For example, the user command may be an instruction in a JSON data format that is compliant with a DOS protocol. The DOS protocol is a communication protocol between a server of DuerOS (conversation artificial intelligence operating system) and a terminal, which is a set of application programming interfaces that open the smart voice interactive capability of DuerOS to all devices. The trigger condition for plug-in downloading may be a condition for triggering plug-in downloading set by a technician or a user.

In practice, the technician may set a plug-in for the target application. The target application may be an operating system, an application program, a program code implementing some functions (e.g., setting an alarm, and invoking music playing software to play a music), or the like. The user speech audio may be the speech of the user. The user speech audio may be used to instruct the target application or the executor to execute some operations. For example, the user speech audio may include, but not limited to, the audio of "turning on the air conditioner," the audio of "turning on the television," the audio of "turning off the light," the audio of "turning on the water heater," the audio of "teaching English," the audio of "teaching how to play the piano," the audio of "playing the piano," the audio of "downloading a plug-in of teaching how to play the piano," the audio of "playing a music," and the audio of "turning down the volume." When the executor is a robot, the user speech audio may be the audio of "learning driving skills," or the audio of "downloading a driving plug-in."

The user command may be a recognition result generated by recognizing, by the executor, the user speech audio through a speech recognition technology, or a recognition result generated by recognizing, by a server, the user speech audio after the executor sends the user speech audio to the server.

As an example, the executor may send the user speech audio to the server. Subsequently, the server may recognize the user speech audio through a technology such as an automatic speech recognition (ASR) technology and a natural language understanding (NLU) technology, to generate the user command. Then, the server sends the user command to the executor.

In some alternative implementations of this embodiment, the trigger condition for plug-in downloading includes that the user command instructs to download a target plug-in. The target plug-in is a plug-in, which is not locally installed, in a preset plug-in set for the target application. As an example, when the executor is the robot, and the user speech audio is "downloading a driving plug-in" or "learning driving skills," the user command may instruct to download the target plug-in. (i.e., the driving plug-in). That is, the user command satisfies the preset trigger condition for plug-in downloading.

In some alternative implementations of this embodiment, the user command instructs to execute an operation, and the trigger condition for plug-in downloading includes that the operation that the user command instructs to execute is in executable. As an example, when the user speech audio is "driving a car" or "turning on the air conditioner," and the executor cannot execute the operation of "driving a car" or "turning on the air conditioner," the operation instructed by the user command is unable to be executed. At this time, the user command satisfies the preset trigger condition for plug-in downloading.

It may be understood that when the executor cannot respond to the user command due to a lack of a plug-in (e.g., the lack of codes for executing some operations), the executor may determine that the operation instructed by the user command is unable to be executed.

Step 202, sending, in response to the user command satisfying the trigger condition for plug-in downloading, a request for downloading a target plug-in to a target server.

In some embodiments, in a situation where the user command satisfies the trigger condition for plug-in downloading, the executor may send the request for downloading the target plug-in to the target server. The target server may be a server communicated with the executor. The target plug-in is the plug-in, which is not locally installed, in the preset plug-in set for the target application. The plug-in in the plug-in set may be used to extend the function of the target application. In practice, the plug-in may be a program code for responding to a user command (e.g., the user command instructed by the user speech audio). When the plug-in is present on the executor, the executor may respond to and recognize the corresponding user command to execute the operation instructed by the user command and supported by the plug-in. It may be understood that the code segments in the plug-in may be different for different devices.

Here, by comparing the plug-in installed on the executor with the plug-in in the plug-in set, or marking, in the plug-in set, the plug-in installed on the executor, the plug-in not installed on the executor is determined in the plug-in set. Here, each plug-in in the plug-in set may be used to support an operation or a set of related operations.

In some alternative implementations of this embodiment, the user command instructs the operation, and the trigger condition for plug-in downloading includes that the operation instructed by the user command is unable to be executed. The target plug-in may be the plug-in in the preset plug-in set for the target application that is not locally installed and supports the operation instructed by the user command.

In practice, the executor or other electronic devices may store a plurality of plug-ins (i.e., a plug-in set) of the target application. Thus, under the premise that it is determined that the operation instructed by the user command is unable to be executed, the executor may send the request for downloading a plug-in to the target server, to download the plug-in supporting the operation instructed by the user command.

Figure 3B:
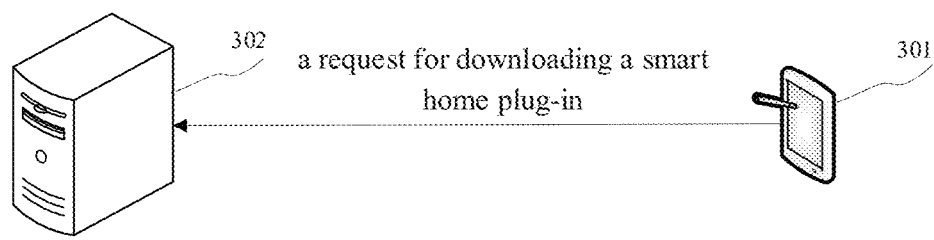

As an example, referring to FIGS. 3A and 3B, schematic diagrams of an application scenario of the method for sending information according to this embodiment are illustrated. In the application scenario of FIG. 3A, the user first inputs the user speech audio "turning on the air conditioner" to a smart phone (i.e., the executor) through the target application (e.g., the application based on the conversational artificial intelligence operating system). After acquiring the user speech audio "turning on the air conditioner," the smart phone determines the user command instructed by the user speech audio "turning on the air conditioner," and then determines whether the user command satisfies the preset trigger condition for plug-in downloading. Here, the trigger condition for plug-in downloading refers to that the operation that the user command instructs to execute is inexecutable. Subsequently, the smart phone determines that the user command satisfies the trigger condition for plug-in downloading. Finally, the smart phone sends the request for downloading the target plug-in (i.e., a request for downloading a smart home plug-in (referring to FIG. 3B)) to the server.

Figure 3C:
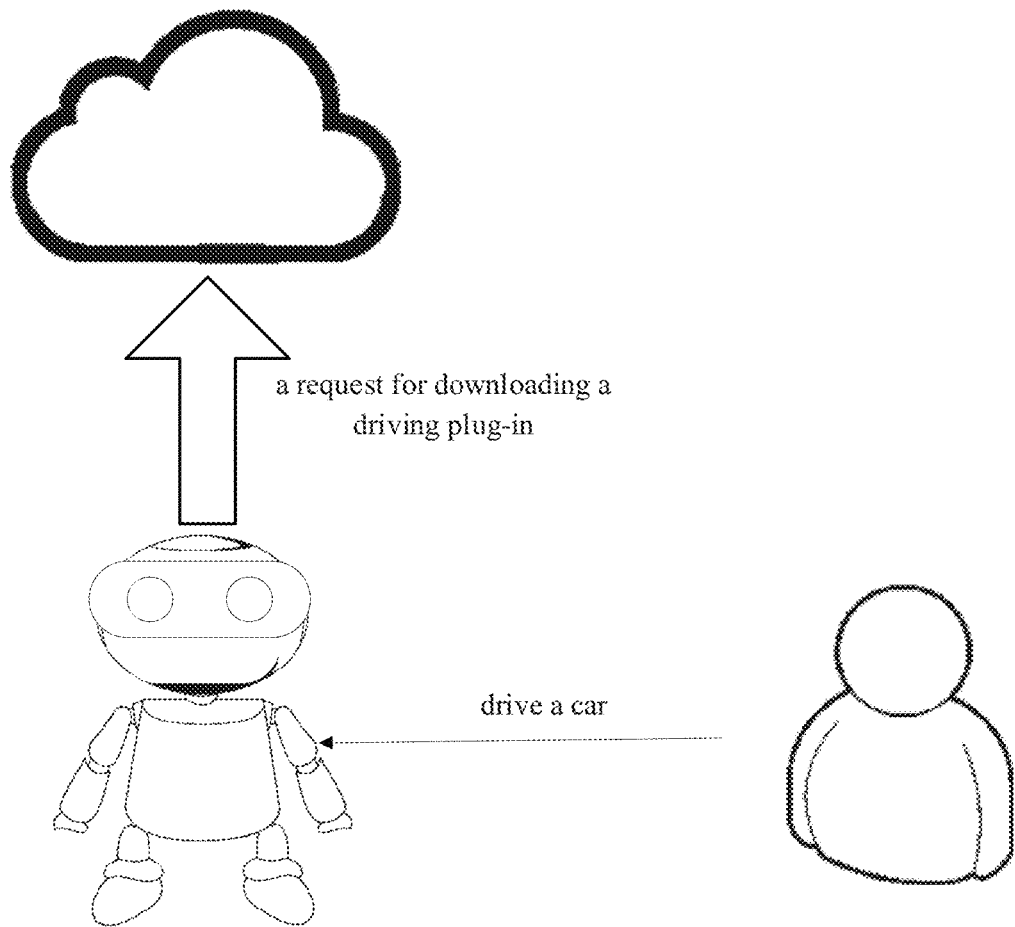
FIG. 3C is a schematic diagram of another application scenario of the method for sending information according to the present disclosure.

As another example, referring to FIG. 3C, a schematic diagram of another application scenario of the method for sending information according to this embodiment is illustrated. In the application scenario of FIG. 3C, the user first inputs the user speech audio "driving a car" to the robot (i.e., the executor) through the target application (e.g., the application installed on the executor and used for supporting the voice interactive function between the executor and the user). After acquiring the user speech audio "driving a car," the robot determines the user command instructed by the user speech audio "driving a car," and then determines whether the user command satisfies the preset trigger condition for plug-in downloading. Here, the trigger condition for plug-in downloading refers to that the operation instructed by the user command is unable to be executed. Subsequently, the robot determines that the user command satisfies the trigger condition for plug-in downloading. Finally, the robot sends the request for downloading the target plug-in (i.e., a request for downloading a driving plug-in (referring to FIG. 3B)) to the server.

Figure 3D:
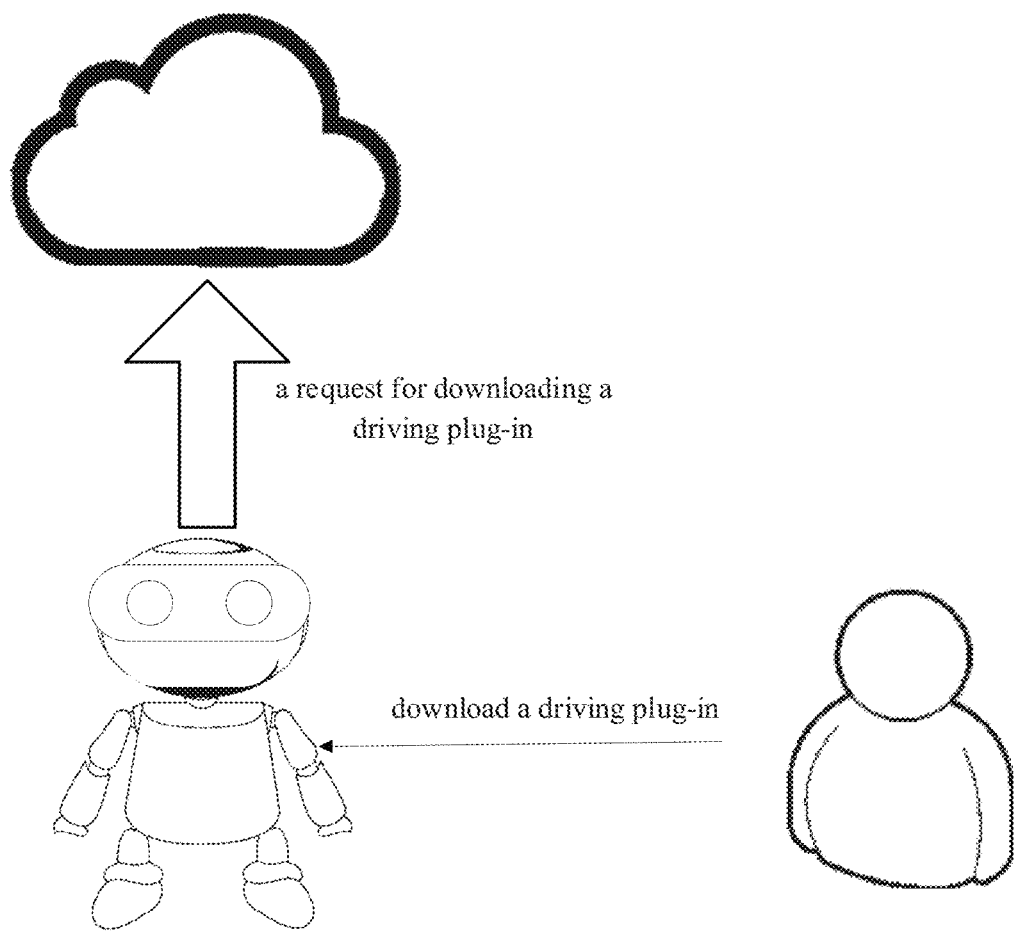
FIG. 3D is a schematic diagram of another application scenario of the method for sending information according to the present disclosure.

As another example, referring to FIG. 3D, a schematic diagram of another application scenario of the method for sending information according to this embodiment is illustrated. In the application scenario of FIG. 3D, the user first inputs the user speech audio "downloading a driving plug-in" to the robot (i.e., the executor) through the target application (e.g., the application installed on the executor and used for supporting the voice interactive function between the executor and the user). After acquiring the user speech audio "downloading a driving plug-in," the robot determines the user command instructed by the user speech audio "downloading a driving plug-in," and then determines whether the user command satisfies the preset trigger condition for plug-in downloading. Here, the trigger condition for plug-in downloading refers to that the user command instructs to download the target plug-in. Here, the target plug-in is the driving plug-in. Subsequently, the robot determines that the user command satisfies the trigger condition for plug-in downloading. Finally, the robot sends the request for downloading the target plug-in (i.e., the request for downloading the driving plug-in) to the server.

In some usage situations, after the executor receives the download address of the plug-in, the user may perform a download operation (e.g., clicking the download address, and inputting speech for instructing to download the plug-in) to download the plug-in. Alternatively, after the executor receives the download address of the plug-in, the executor may also automatically download the plug-in without detecting whether the user performs the download operation.

Alternatively, the executor may also receive the code of the plug-in sent by the target server, that is, the download address of the plug-in may also be the plug-in itself.

It may be understood that, on a device (i.e., the executor) supporting the voice interactive operating system (e.g., DuerOS), when the user speaks some words to the device and the device cannot execute the corresponding operation according to the words of the user, the device may automatically download the plug-in through the solution. In the embodiment of the present disclosure, to update or download the program code corresponding to the user command (or corresponding to the user speech audio). At this time, the device does not need to re-install the target application. After downloading and installing the plug-in, the device may continue executing the unfinished operation instructed by the user.

According to the method provided by the above embodiment of the present disclosure, under the premise that the user speech audio is acquired through the target application, whether the operation instructed by the user command is able to be executed is determined. Then, under the premise that the operation is unable to be executed, the user command instructed by the user speech audio is determined. Next, whether the user command satisfies the preset trigger condition for plug-in downloading is determined. If the user command satisfies the preset trigger condition for plug-in downloading, the request for downloading the target plug-in is sent to the target server, which helps the terminal device download the plug-in through the user speech audio. Accordingly, the flexibility of sending the information is improved, which helps enrich the approaches of downloading the plug-in, and implement the automatic downloading of the plug-in and the automatic learning of the application.

Figure 4:
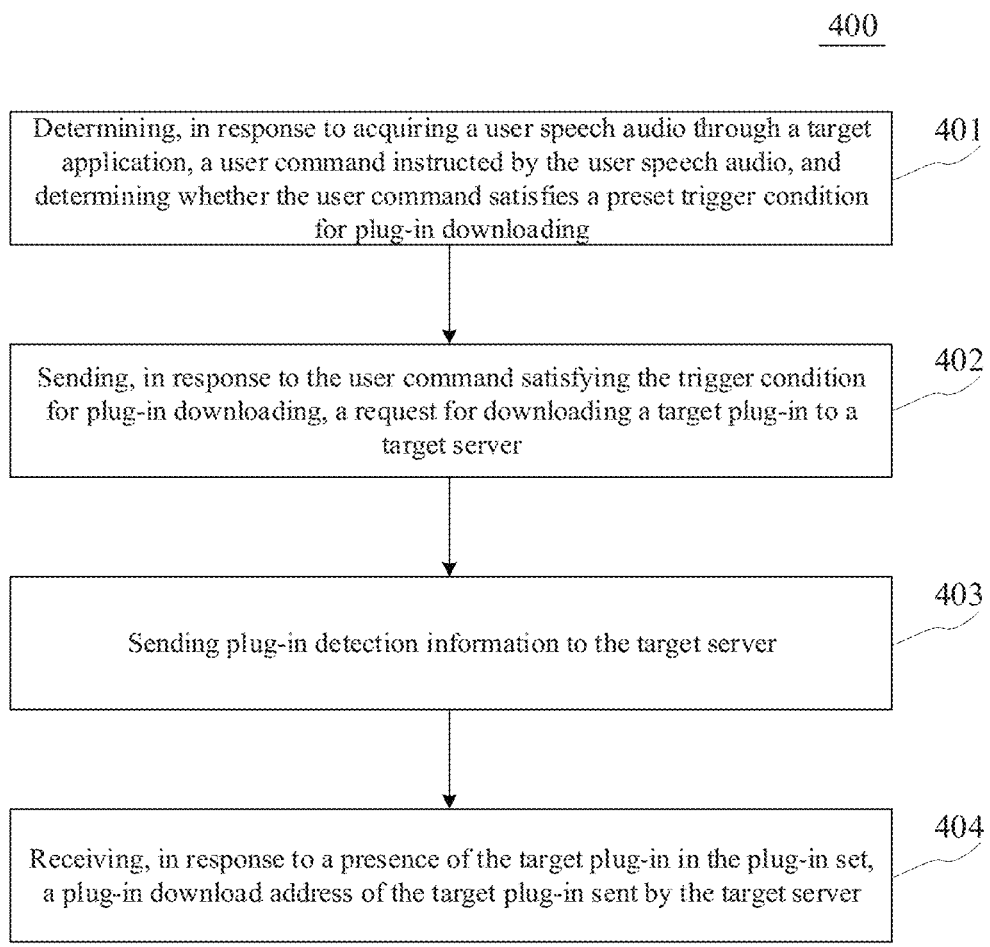
FIG. 4 is a flowchart of another embodiment of the method for sending information according to the present disclosure.

Further referring to FIG. 4, a flow 400 of another embodiment of the method for sending information is illustrated. The flow 400 of the method for sending information includes the following steps.

Step 401, determining, in response to acquiring a user speech audio through a target application, a user command instructed by the user speech audio, and determining whether the user command satisfies a preset trigger condition for plug-in downloading.

Step 402, sending, in response to the user command satisfying the trigger condition for plug-in downloading, a request for downloading a target plug-in to a target server.

In some embodiments, steps 401 and 402 are substantially the same as steps 201 and 202 in the corresponding embodiment of FIG. 2, which will not be repeatedly described here.

Step 403, sending plug-in detection information to the target server.

In some embodiments, an executor (e.g., the server shown in FIG. 1) of the method for sending information may send the plug-in detection information to the target server. The plug-in detection information is used to instruct the target server to detect whether the target plug-in is present in the plug-in set. The target plug-in is a plug-in, which is not locally installed, in a preset plug-in set for the target application.

Step 404, receiving, in response to a presence of the target plug-in in the plug-in set, a plug-in download address of the target plug-in sent by the target server.

In some embodiments, the executor may receive the plug-in download address of the target plug-in sent by the target server in the situation where the target plug-in is present in the plug-in set. The plug-in download address is used to download the target plug-in.

In some alternative implementations of this embodiment, the executor may further download the plug-in indicated by the plug-in download address the situation where a download operation for the plug-in download address is detected.

In some alternative implementations of this embodiment, the sending plug-in detection information to the target server may include: sending the plug-in detection information to the target server periodically. A technician or a user may set the time length of the period. For example, the executor may send the plug-in detection information to the target server every 4 days or 9 hours.

It may be understood that, by sending the plug-in detection information to the target server periodically by the executor, whether a plug-in not installed on a terminal is present in the plug-in set may be detected at a fixed time interval, thereby ensuring the timely update of the plug-in on the terminal.

In some alternative implementations of this embodiment, the sending plug-in detection information to the target server may include: sending, in response to determining the target application being in a non-running status or a background running status, the plug-in detection information to the target server.

In practice, the executor or the technician may determine whether the target application is in the non-running status and whether the target application is in the background running status in various ways. For example, the executor may continuously monitor whether the user exits the target application, to determine whether the target application is in the non-running status or the background running status. Alternatively, the target server may determine whether the target application is in the non-running status or the background running status through characteristics of a data interaction between the target server and the executor through the target application. For example, when the target application does not perform the data interaction with the target server in a period of time exceeding a preset time length (e.g., 3 minutes), it may be determined that the target application is the non-running status.

In some alternative implementations of this embodiment, the sending plug-in detection information to the target server may include: sending, in response to determining a current network being not a cellular network, the plug-in detection information to the target server.

In some alternative implementations of this embodiment, the sending plug-in detection information to the target server may include: sending, in response to determining a current system resource usage rate being less than a preset system resource usage rate threshold, the plug-in detection information to the target server. The current system resource usage rate may include, but not limited to, a resource usage rate of at least one of a central processing unit (CPU), a storage memory, or a running memory or the current executor. The system resource usage rate threshold may be a value or a system resource usage rate set by the technician or the user. It may be understood that when the current system resource usage rate is less than the preset system resource usage rate threshold, the executor sends the plug-in detection information to the target server to request to download the plug-in. Thus, the plug-in may be downloaded under the premise of ensuring that the executor is in a good usage state (i.e., the current system resource usage rate being less than the preset system resource usage rate threshold).

In some alternative implementations of this embodiment, the sending plug-in detection information to the target server may include: sending, in response to a preset time length passing since a last download of the plug-in, the plug-in detection information to the target server. The preset time length may be a time length set by the technician or the user, for example, 3 days or 8 hours.

It may be seen from FIG. 4 that, as compared with the embodiment corresponding to FIG. 2, the flow 400 of the method for sending information in some embodiments emphasizes the step of sending the plug-in detection information to the target, server, and the step of receiving the plug-in download address of the target plug-in sent by the target server. Accordingly, the solution described in some embodiments may extend the function of the target application in more ways, and enrich the approaches of downloading the plug-in, which helps realize the automatic downloading of the plug-in of the application without affecting the use of the target application by the user.

Figure 5:
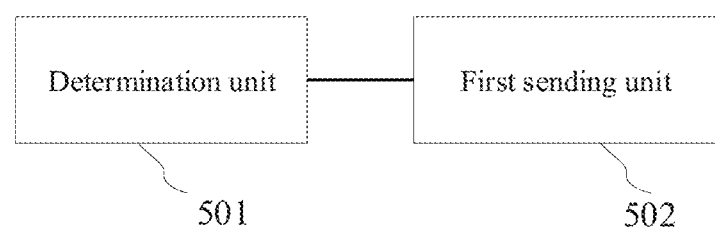
FIG. 5 is a schematic structural diagram of an embodiment of an apparatus for sending information according to the present disclosure.

Further referring to FIG. 5, as an implementation of the method shown in the above drawings, the present disclosure provides an embodiment of an apparatus for sending information. The embodiment of the apparatus corresponds to the embodiment of the method shown in FIG. 2. In addition to the characteristics described below, the embodiment of the apparatus may further include characteristics and effects identical to or corresponding to that in the embodiment of the method shown in FIG. 2. The apparatus may be applied in various electronic devices.

As shown in FIG. 5, the apparatus 500 for sending information in some embodiments includes: a determination unit 501 and a first sending unit 502. The determination unit 501 is configured to determine, in response to acquiring a user speech audio through a target application, a user command instructed by the user speech audio, and determine whether the user command satisfies a preset trigger condition for plug-in downloading. The first sending unit 502 is configured to send, in response to the user command satisfying the trigger condition for plug-in downloading, a request for downloading a target plug-in to a target server. The target plug-in is a plug-in, which is not locally installed, in a preset plug-in set for the target application.

In some embodiments, under the premise that the user speech audio is acquired through the target application, the determination unit 501 of the apparatus 500 for sending information may determine the user command instructed by the user speech audio. Then, the executor may further determine whether the user command satisfies the preset trigger condition for plug-in downloading.

Here, the target application may be an application installed on the executor. For example, the target application may be an application having a voice interactive function (e.g., an application based on a conversational artificial intelligence operating system).

In practice, a technician may set a plug-in for the target application. The target application may be an operating system, an application program, a program code implementing some functions (e.g., setting an alarm, and invoking music playing software to play a music), or the like.

The user speech audio may be the speech of the user. The user speech audio may be used to instruct the target application or the executor to execute some operations. For example, the user speech audio may include, but not limited to, the audio of "turning on the air conditioner," the audio of "turning on the television," the audio of "turning off the light," the audio of "turning on the water heater," the audio of "teaching English," the audio of "teaching how to play the piano," the audio of "playing the piano," the audio of "downloading a plug-in of teaching how to play the piano," the audio of "playing a music," and the audio of "turning down the volume." The user speech audio may be the audio of "learning driving skills," or the audio of "downloading a driving plug-in."

The user command may be a recognition result generated by recognizing, by the executor, the user speech audio through a speech recognition technology, or a recognition result generated by recognizing, by other servers (e.g., a cloud), the user speech audio after the executor sends the user speech audio to the servers.

The trigger condition for plug-in downloading may be a condition for triggering a plug-in downloading set by a technician or a user.

In some embodiments, under the premise that the user command satisfies the trigger condition for plug-in downloading, the first sending unit 502 may send the request for downloading the target plug-in to the target server. The target server may be a server communicated with the executor. The target plug-in may be the plug-in that is not locally installed in the preset plug-in set for the target application. Here, by comparing the plug-in installed on the executor with the plug-in in the plug-in set, or marking, in the plug-in set, the plug-in installed on the executor, the plug-in not installed on the executor is determined in the plug-in set. In practice, the plug-in may be a program code for responding to a user command (e.g., the user command instructed by the user speech audio). When the plug-in is present on the executor, the executor may respond to and recognize the corresponding user command to execute the operation instructed by the user command and supported by the plug-in. It may be understood that the code segments in the plug-in may be different for different devices.

In some alternative implementations of this embodiment, the user command indicates an implementation operation. The trigger condition for plug-in downloading includes that the operation that the user command instructs to execute is inexecutable. The target plug-in supports the operation.

It may be understood that when the executor cannot respond to the user command due to a lack of a plug-in (e.g., the lake of codes for executing some operations), the executor may determine that the operation instructed by the user command is unable to be executed.

In some alternative implementations of this embodiment, the trigger condition for plug-in downloading includes that the user command indicates a download of the target plug-in. The target plug-in may be a plug-in, which is not locally installed, in the preset plug-in set for the target application. The plug-in in the plug-in set may be used to extend the function of the target application.

In practice, the executor or other electronic devices may store a plurality of plug-ins (i.e., a plug-in set) of the target application. Thus, under the premise that it is determined that the implementation operation instructed by the user command is unable to be executed, the executor may send the request for downloading a plug-in to the target server, to download a plug-in supporting the operation.

In some alternative implementations of this embodiment, the apparatus 500 further includes: a second sending unit (not shown), configured to send plug-in detection information to the target server, the plug-in detection information instructs the target server to detect whether the target plug-in is present in the plug-in set; and a receiving unit (not shown), configured to receive, in response to a presence of the target plug-in in the plug-in set, a plug-in download address of the target plug-in sent by the target server. The plug-in detection information is used to indicate that the target server detects whether the target plug-in is present in the plug-in set. The target plug-in is the plug-in not locally installed in the preset plug-in set for the target application. The plug-in download address is used to download the target plug-in.

In some alternative implementations of this embodiment, the apparatus 500 further includes: a downloading unit (not shown), configured to download, in response to detecting a download operation for the plug-in download address, the plug-in indicated by the plug-in download address.

In some alternative implementations of this embodiment, the second sending unit may include a first sending module (not shown), configured to send the plug-in detection information to the target server periodically. The technician or the user may set the time length of the period. For example, the executor may send the plug-in detection information to the target server every 4 days or 9 hours.

It may be understood that, by sending the plug-in detection information to the target server periodically by the executor, whether a plug-in not installed on a terminal is present in the plug-in set may be detected at a fixed time interval, thereby ensuring the timely update of the plug-in on the terminal.

In some alternative implementations of this embodiment, the second sending unit may include a second sending module (not shown), configured to send, in response to determining the target application being in a non-running status or a background running status, the plug-in detection information to the target server.

In practice, the executor or the technician may determine whether the target application is in the non-running status and whether the target application is in the background running status in various ways. For example, the executor may continuously monitor whether the user exits the target application, to determine whether the target application is in the non-running status or the background running status. Alternatively, the target server may determine whether the target application is in the non-running status and whether the target application is in the background running status through characteristics of a data interaction between the target server and the executor through the target application. For example, when the target application does not perform the data interaction with the target server in a period of time exceeding a preset time length (e.g., 3 minutes), it may be determined that the target application is in the non-running status.

In some alternative implementations of this embodiment, the second sending unit may include a third sending module (not shown), configured to send, in response to determining a current network being not a cellular network, the plug-in detection information to the target server.

In some alternative implementations of this embodiment, the second sending unit may include a fourth sending module (not shown), configured to send, in response to determining a current system resource usage rate being less than a preset system resource usage rate threshold, the plug-in detection information to the target server.

Here, the current system resource usage rate may include, but not limited to, a resource usage rate of at least one of a central processing unit (CPU), a storage memory, or a running memory of the current executor. The system resource usage rate threshold may be a value of a system resource usage rate set by the technician or the user. It may be understood that when the current system resource usage rate is less than the preset system resource usage rate threshold, the executor sends the plug-in detection information to the target server to request to download the plug-in. Thus, the plug-in may be downloaded under the premise of ensuring the usage state of the executor to a certain extent.

According to the apparatus provided by the embodiment of the present disclosure, in the situation where the user speech audio is acquired through the target application, the user command instructed by the user speech audio is determined by the determination unit 501, and whether the user command satisfies the preset trigger condition for plug-in downloading is determined by the determination unit 501. If the user command satisfies the preset trigger condition for plug-in downloading, the first sending unit 502 sends the request for downloading the target plug-in is sent to the target server, which helps the terminal device to download the plug-in through the user speech audio. Accordingly, the flexibility of sending the information is improved, which helps to enrich the approaches of downloading the plug-in, and implement the automatic downloading of the plug-in and the automatic learning of the application.

Figure 6:
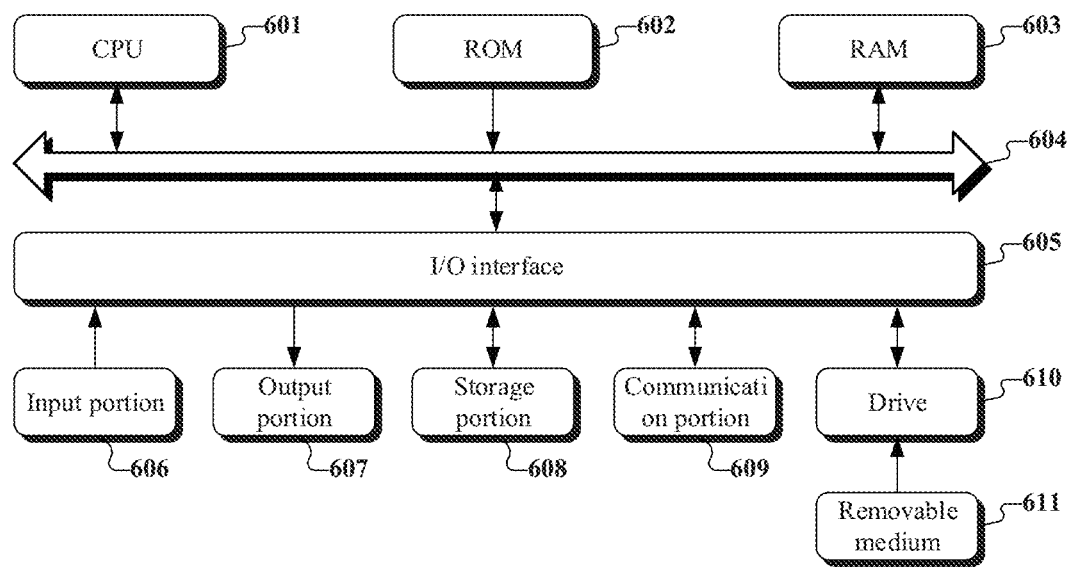
FIG. 6 is a schematic structural diagram of a computer system adapted to implement a server according to the embodiments of the present disclosure.

Referring to FIG. 6, FIG. 6 illustrates a schematic structural diagram of a computer system 600 adapted to implement a terminal device of the embodiments of the present disclosure. The terminal device shown in FIG. 6 is merely an example and should not impose any restriction on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other via a bus 604. An input/output (I/O) interface 605 is also connected to the bus 604.

The following components are connected to the I/O interface 605: an input portion 606 including a keyboard, a mouse. etc.; an output portion 607 including a cathode ray tube (CRT), a liquid crystal display device (LCD), a speaker, etc.; a storage portion 608 including a hard disk and the like; and a communication portion 609 including a network interface card, for example, a LAN card and a modem. The communication portion 609 performs communication processes via a network such as the Internet. A driver 610 is also connected to the I/O interface 605 as required. A removable medium 611, for example, a magnetic disk, an optical disk, a magneto-optical disk, and a semiconductor memory, may be installed on the driver 610, to facilitate the installation of a computer program from the removable medium 611 on the storage portion 608 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through. Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, comprising a determination unit and a first sending unit. The names of these units do not in some cases constitute a limitation to such units themselves. For example, the determination unit may also be described as "a unit for determining a user command instructed by a user speech audio."

In another aspect, the present disclosure further provides a computer readable medium. The computer readable medium may be the computer readable medium included in the terminal device described in the above embodiments, or a stand-alone computer readable medium not assembled into the terminal device. The computer readable medium stores one or more programs. The one or more programs, when executed by the terminal device, cause the terminal device to: determine, in response to acquiring a user speech audio through a target application, a user command instructed by the user speech audio, and determine whether the user command satisfies a preset trigger condition for plug-in downloading; and send, in response to the user command satisfying the trigger condition for plug-in downloading, a request for downloading a target plug-in to a target server, the target plug-in being a plug-in in a preset plug-in set for the target application, and the plug-in being not locally installed.

Figure 7:
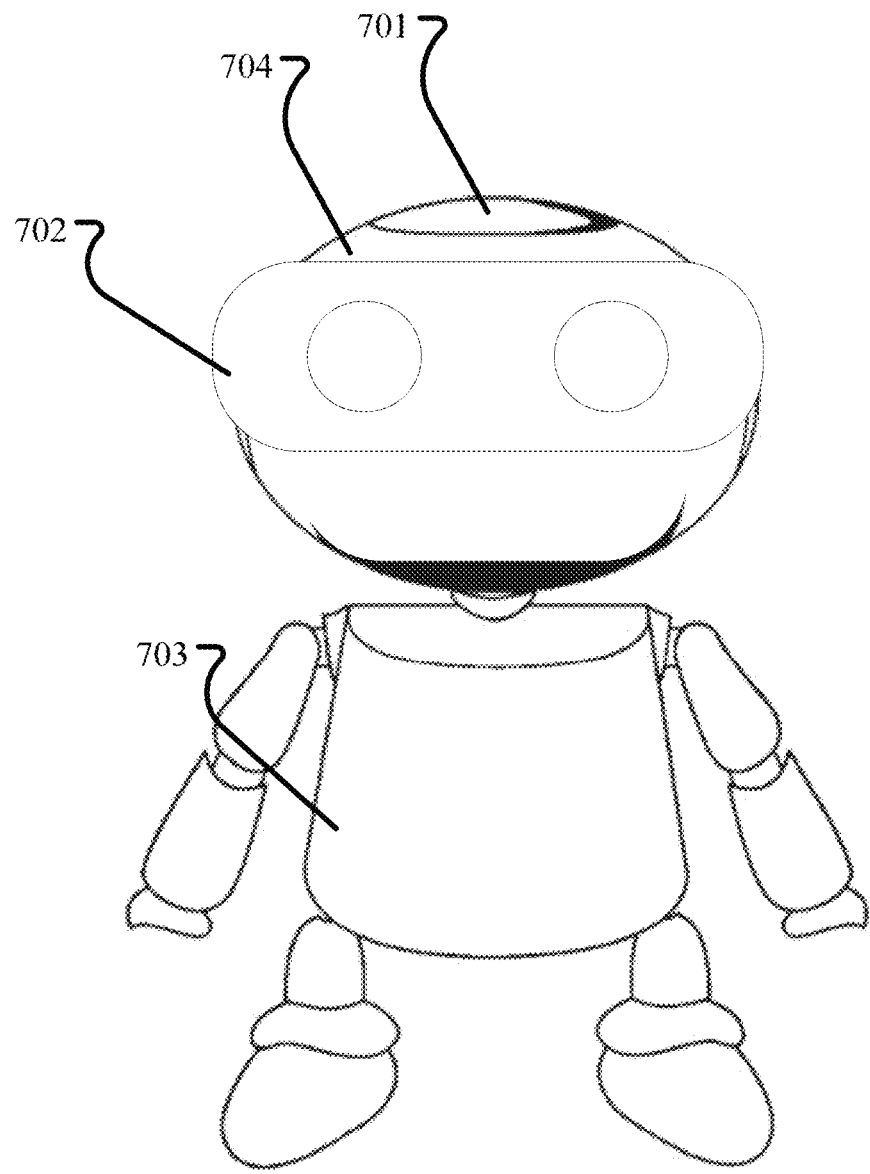
FIG. 7 is a schematic structural diagram of a robot adapted to implement the embodiments of the present disclosure.

As an example, the terminal device may be a robot. Referring to FIG. 7, FIG. 7 is an illustrative structural diagram of a robot according to the embodiments of the present disclosure. The robot may include: an audio acquisition device 701, configured to acquire a user speech audio through a target application; a request sending device 702, configured to send a request for downloading a target plug-in to a target server; one or more processors 703; and a storage device 704, configured to store one or more programs. The one or more programs, when executed by the robot, cause the robot to determine a user command instructed by the user speech audio in the situation where the user speech audio is acquired through the target application, and determine whether the user command satisfies a preset trigger condition for plug-in downloading; and send, if the user command satisfies the trigger condition for plug-in downloading, the request for downloading the target plug-in to the target server, the target plug-in being a plug-in in a preset plug-in set for the target application, and the plug-in being not locally installed.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but

What is claimed is:

1. A method for sending information, comprising:
    determining, in response to acquiring a user speech audio through a target application, a user command instructed by the user speech audio, and determining whether the user command satisfies a preset trigger condition for plug-in downloading;
    sending, in response to the user command satisfying the trigger condition for plug-in downloading, a request for downloading a target plug-in to a target server, the target plug-in being a plug-in in a preset plug-in set for the target application, and the plug-in being not locally installed;
    sending plug-in detection information to the target server, the plug-in detection information instructs the target server to detect whether the target plug-in is present in the preset plug-in set; and
    receiving, in response to detecting a presence of the target plug-in in the preset plug-in set, a plug-in download address of the target plug-in sent by the target server.

2. The method according to claim 1, wherein the user command instructs to execute an operation, the trigger condition for plug-in downloading includes that the operation the user command instructs to execute is inexecutable, and the target plug-in supports the operation.

3. The method according to claim 1, wherein the trigger condition for plug-in downloading includes that the user command instructs to download the target plug-in.

4. The method according to claim 1, further comprising:
    downloading, in response to detecting a download operation for the plug-in download address, the plug-in indicated by the plug-in download address.

5. The method according to claim 4, wherein the sending plug-in detection information to the target server includes at least one of:

sending the plug-in detection information to the target server periodically;

sending, in response to determining the target application being in a non-running status or a background running status, the plug-in detection information to the target server;

sending, in response to determining a current network being not a cellular network, the plug-in detection information to the target server; or sending, in response to determining a current system resource usage rate being less than a preset system resource usage rate threshold, the plug-in detection information to the target server.

6. A robot, comprising:

one or more processors; and a storage device, configured to store one or more programs, wherein the one or more programs, when executed by the one or more processors, cause the one or more processors to acquire a user speech audio through a target application, and send a request for downloading a target plug-in to a target server, to implement the method according to claim 1.

7. An apparatus for sending information, comprising:

at least one processor; and a memory storing instructions, the instructions when executed by the at least one processor, cause the at least one processor to perform operations, the operations comprising:

determining, in response to acquiring a user speech audio through a target application, a user command instructed by the user speech audio, and determining whether the user command satisfies a preset trigger condition for plug-in downloading;

sending, in response to the user command satisfying the trigger condition for plug-in downloading, a request for downloading a target plug-in to a target server, the target plug-in being a plug-in in a preset plug-in set for the target application, and the plug-in being not locally installed;

sending plug-in detection information to the target server, the plug-in detection information instructs the target server to detect whether the target plug-in is present in the preset plug-in set; and receiving, in response to detecting a presence of the target plug-in in the preset plug-in set, a plug-in download address of the target plug-in sent by the target server.

8. The apparatus according to claim 7, wherein the user command instructs to execute an operation, the trigger condition for plug-in downloading includes that the operation the user command instructs to execute is inexecutable, and the target plug-in supports the operation.

9. The apparatus according to claim 7, wherein the trigger condition for plug-in downloading includes that the user command instructs to download the target plug-in.

10. The apparatus according to claim 7, further comprising:

downloading, in response to detecting a download operation for the plug-in download address, the plug-in indicated by the plug-in download address.

11. The apparatus according to claim 10, wherein the sending plug-in detection information to the target server includes at least one of:

sending the plug-in detection information to the target server periodically;

sending, in response to determining the target application being in a non-running status or a background running status, the plug-in detection information to the target server;

sending, in response to determining a current network being not a cellular network, the plug-in detection information to the target server; or sending, in response to determining a current system resource usage rate being less than a preset system resource usage rate threshold, the plug-in detection information to the target server.

12. A non-transitory computer-readable storage medium storing a computer program, the computer program when executed by one or more processors, causes the one or more processors to perform operations, the operations comprising:

determining, in response to acquiring a user speech audio through a target application, a user command instructed by the user speech audio, and determining whether the user command satisfies a preset trigger condition for plug-in downloading;

sending, in response to the user command satisfying the trigger condition for plug-in downloading, a request for downloading a target plug-in to a target server, the target plug-in being a plug-in in a preset plug-in set for the target application, and the plug-in being not locally installed;

sending plug-in detection information to the target server, the plug-in detection information instructs the target server to detect whether the target plug-in is present in the preset plug-in set; and receiving, in response to detecting a presence of the target plug-in in the preset plug-in set, a plug-in download address of the target plug-in sent by the target server.

* * * * *